(12) United States Patent
Chen et al.

(10) Patent No.: US 10,764,130 B2
(45) Date of Patent: *Sep. 1, 2020

(54) AUTOMATICALLY RECONFIGURING AN INPUT INTERFACE

(75) Inventors: Feng-wei Chen, Cary, NC (US);
Joseph B. Hall, Durham, NC (US);
Samuel R. McHan, Jr., Apex, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1545 days.

This patent is subject to a terminal disclaimer.

(21) Appl. No.: 13/422,737

(22) Filed: Mar. 16, 2012

(65) Prior Publication Data
US 2012/0192091 A1 Jul. 26, 2012

Related U.S. Application Data

(63) Continuation of application No. 12/907,311, filed on Oct. 19, 2010.

(51) Int. Cl.
*H04L 12/24* (2006.01)
*G06F 9/451* (2018.01)
*G06F 3/0488* (2013.01)

(52) U.S. Cl.
CPC ...... *H04L 41/0816* (2013.01); *G06F 3/04886* (2013.01); *G06F 9/451* (2018.02)

(58) Field of Classification Search
CPC . G06F 3/04886; G06F 9/4443; H04L 41/0816
USPC ................................. 715/765, 843
See application file for complete search history.

(56) References Cited

U.S. PATENT DOCUMENTS

| | | | | |
|---|---|---|---|---|
| 4,100,602 A | * | 7/1978 | Shapiro | G06F 15/0258 341/78 |
| 4,661,916 A | * | 4/1987 | Baker | G10L 13/00 704/260 |
| 4,872,112 A | * | 10/1989 | Hungerford | G06F 15/025 700/90 |

(Continued)

FOREIGN PATENT DOCUMENTS

CN           11561744           10/2009

OTHER PUBLICATIONS

"Application Specific Keyboard Setup Delivery with Icons and Pictures", < http://www.ip.com/pubview/IPCOM000156660D >.

*Primary Examiner* — Li P Sun
*Assistant Examiner* — Henry Orr
(74) *Attorney, Agent, or Firm* — Fabian VanCott; Steven L. Nichols

(57) ABSTRACT

A method for providing an automatically reconfigurable input interface includes analyzing input received through an input interface of the computing device, determining a context based on the input; and reconfiguring the input interface to comprise a key based on a domain associated with the context. A computing system for providing automatic reconfiguration of an input interface includes a processor and a memory communicatively coupled to the processor. The processor is configured to analyze input received through an input interface of a computing device, determine a context based on the input, and reconfigure the input interface to comprise a key based on a domain associated with the context.

15 Claims, 8 Drawing Sheets

(56) References Cited

U.S. PATENT DOCUMENTS

| | | | | |
|---|---|---|---|---|
| 5,101,368 | A * | 3/1992 | Kaplan | G06F 15/025 708/133 |
| 5,128,672 | A * | 7/1992 | Kaehler | G06F 3/0237 341/23 |
| 5,299,125 | A * | 3/1994 | Baker | G09B 21/00 434/112 |
| 5,920,303 | A * | 7/1999 | Baker | G06F 3/0237 340/4.1 |
| 6,310,608 | B1 * | 10/2001 | Kaply | G06F 3/0238 341/22 |
| 6,392,640 | B1 * | 5/2002 | Will | G06F 1/1626 345/184 |
| 7,479,949 | B2 * | 1/2009 | Jobs | G06F 3/0488 345/169 |
| 7,752,569 | B2 * | 7/2010 | Schultz | G06F 3/04886 345/156 |
| 8,117,540 | B2 * | 2/2012 | Assadollahi | 715/256 |
| 8,266,528 | B1 * | 9/2012 | Hayes | 715/256 |
| 8,301,668 | B1 * | 10/2012 | He et al. | 707/804 |
| 2003/0016252 | A1 * | 1/2003 | Noy | G06F 3/0481 715/856 |
| 2003/0095107 | A1 * | 5/2003 | Griffin | G06F 1/1626 345/168 |
| 2005/0024340 | A1 * | 2/2005 | Bathiche | G06F 3/0238 345/170 |
| 2006/0061542 | A1 * | 3/2006 | Stokic | G06F 3/0202 345/156 |
| 2007/0016862 | A1 * | 1/2007 | Kuzmin | G06F 3/0236 715/700 |
| 2007/0040813 | A1 * | 2/2007 | Kushler | G06F 3/0237 345/173 |
| 2007/0080947 | A1 * | 4/2007 | Rau | G06F 1/1626 345/169 |
| 2007/0100635 | A1 * | 5/2007 | Mahajan | G10L 15/22 704/276 |
| 2007/0182595 | A1 * | 8/2007 | Ghasabian | G06F 1/1615 341/22 |
| 2008/0021699 | A1 * | 1/2008 | Verma | G06F 3/0238 704/8 |
| 2008/0027911 | A1 * | 1/2008 | Abbar | G06F 17/30401 |
| 2008/0072143 | A1 * | 3/2008 | Assadollahi | G06F 3/0236 715/261 |
| 2008/0072175 | A1 * | 3/2008 | Corbett | G06F 3/048 715/810 |
| 2008/0122796 | A1 * | 5/2008 | Jobs | G06F 3/0488 345/173 |
| 2008/0174570 | A1 * | 7/2008 | Jobs | G06F 3/0488 345/173 |
| 2008/0235624 | A1 * | 9/2008 | Murata | G06F 3/0482 715/825 |
| 2008/0270897 | A1 * | 10/2008 | Jawerth | G06F 1/162 715/261 |
| 2008/0281583 | A1 * | 11/2008 | Slothouber | G06F 17/276 704/10 |
| 2009/0092723 | A1 * | 4/2009 | Flynn, Jr. | A47J 36/32 426/523 |
| 2009/0179854 | A1 * | 7/2009 | Weber | G06F 1/1626 345/156 |
| 2009/0186663 | A1 * | 7/2009 | Griffin | H04M 1/0231 455/566 |
| 2009/0228825 | A1 * | 9/2009 | Van Os | G06F 3/0488 715/780 |
| 2009/0313572 | A1 * | 12/2009 | Paek | G06F 3/0482 715/780 |
| 2009/0327976 | A1 * | 12/2009 | Williamson | G06F 3/04883 715/863 |
| 2010/0107106 | A1 * | 4/2010 | Corbett | G06F 3/048 715/773 |
| 2010/0107107 | A1 * | 4/2010 | Corbett | G06F 3/048 715/773 |
| 2010/0131900 | A1 * | 5/2010 | Spetalnick | G06F 17/276 715/825 |
| 2010/0141484 | A1 * | 6/2010 | Griffin | G06F 1/1616 341/22 |
| 2010/0151913 | A1 * | 6/2010 | Park | G06F 1/1626 455/566 |
| 2010/0194690 | A1 * | 8/2010 | Wilairat | G06F 3/0237 345/168 |
| 2010/0228724 | A1 * | 9/2010 | Petri | G06F 17/30489 707/722 |
| 2010/0231523 | A1 * | 9/2010 | Chou | G06F 3/018 345/171 |
| 2010/0302163 | A1 * | 12/2010 | Ghassabian | G06F 3/0237 345/168 |
| 2010/0321299 | A1 * | 12/2010 | Shelley | G06F 1/1673 345/168 |
| 2011/0071819 | A1 * | 3/2011 | Miller | G06F 17/273 704/9 |
| 2011/0074685 | A1 * | 3/2011 | Causey | G06F 3/04886 345/168 |
| 2011/0087990 | A1 * | 4/2011 | Ng | G06F 3/04886 715/773 |
| 2011/0175826 | A1 * | 7/2011 | Moore | G06F 3/04886 345/173 |
| 2011/0246575 | A1 * | 10/2011 | Murayama | G06F 17/30011 709/204 |
| 2012/0016678 | A1 * | 1/2012 | Gruber | G10L 15/22 704/275 |
| 2012/0096409 | A1 * | 4/2012 | Chen et al. | 715/843 |
| 2014/0173407 | A1 * | 6/2014 | Kruglick | G06F 40/274 715/226 |

\* cited by examiner

AUTOMATICALLY RECONFIGURING AN INPUT INTERFACE

RELATED APPLICATIONS

The present application is a continuation of and claimed priority under 35 U.S.C. § 120 to U.S. application Ser. No. 12/907,311, filed Oct. 19, 2010, entitled "AUTOMATICALLY RECONFIGURING AN INPUT INTERFACE," which is incorporated herein by reference in its entirety.

BACKGROUND

Aspects of the present invention relate in general to user input systems, and more particularly, to user input interfaces that are capable of automatic reconfiguration based on both user preferences and application context.

Many computing devices make use of a touch-screen input interface. Such an interface includes a display that is sensitive to a user's touch. This allows the display to act both as an output device and an input device. Use of a touch-screen can provide a user with a variety of input interfaces rather than a single input interface.

Touch-screen input systems are often used on compact computing devices such as smart phones and Personal Digital Assistants (PDAs). The process of entering information into such compact computing devices can become relatively time consuming due to the small size of the devices. This is because the user must slow down the input process to ensure accuracy as he or she presses the keys provided by the input interface.

BRIEF SUMMARY

A method for automatically reconfiguring input interface includes, with a physical computing device, analyzing input received through an input interface of the computing device, determining a context based on the input; and reconfiguring the input interface to comprise a key based on a domain associated with the context.

A computing system includes a processor and a memory communicatively coupled to the processor. The processor is configured to analyze input received through an input interface of a computing device, determine a context based on the input, and reconfigure the input interface to comprise a key based on a domain associated with the context.

A computer program product for providing an automatically reconfigurable context based input interface includes a computer readable storage medium having computer readable code embodied therewith. The computer readable program code includes computer readable program code configured to analyze input received through an input interface of a computing device, computer readable program code configured to determine a context based on the input, and computer readable program code configured to reconfigure the input interface to include a key based on a domain associated with the context.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
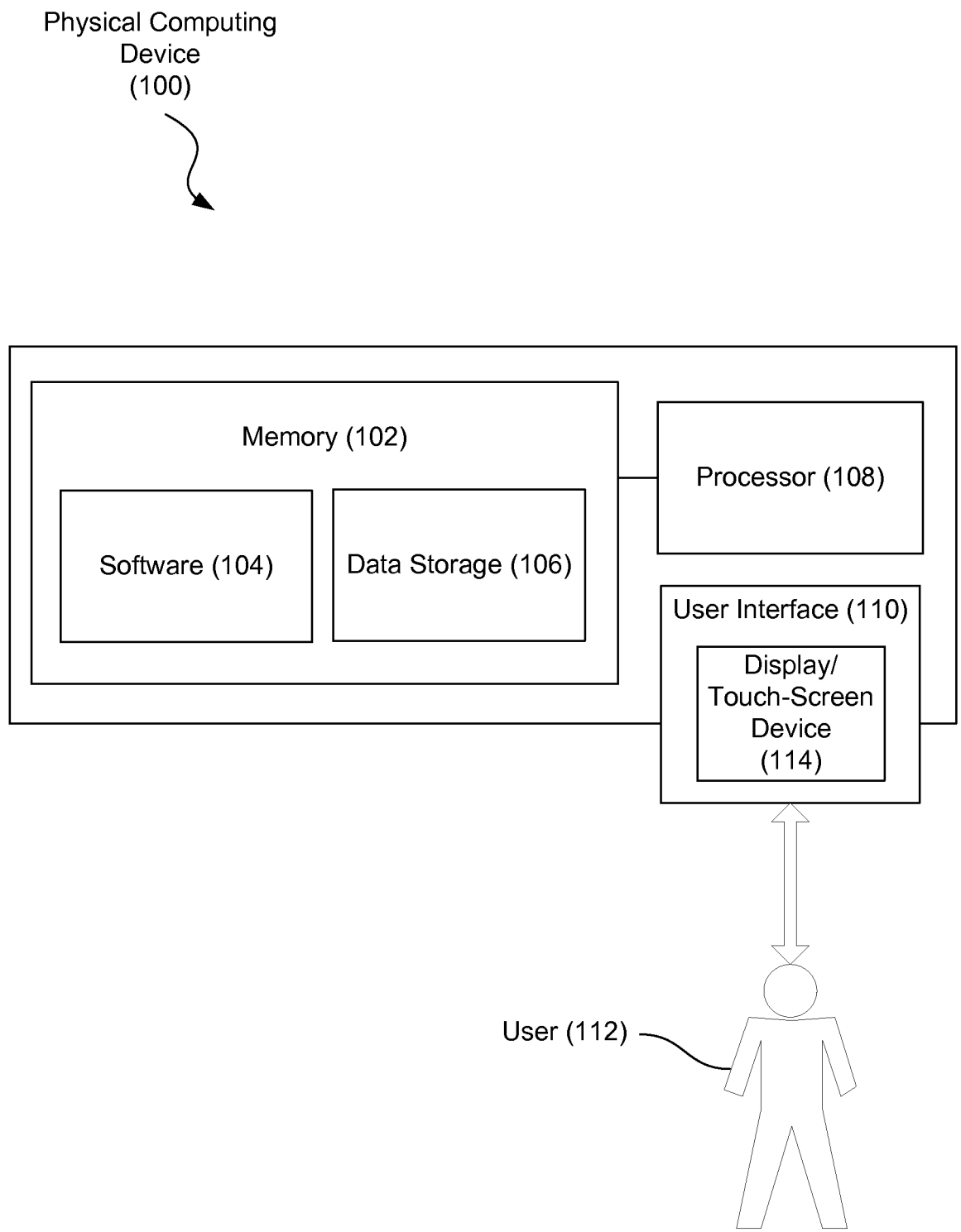
FIG. 1 is a diagram showing an illustrative physical computing system, according to one embodiment of principles described herein.

Where at least part of a user interface is displayed on a display device such as a touch-screen, the present specification discloses methods and systems that provide a user with an input interface capable of automatic reconfiguration based on context. As used in this specification and in the appended claims, the term context means a category of document from among a number of predetermined categories. The context of a document can be determined, at least in part, based on a user's current input actions to create the document being categorized. Based on this context, a system can consult a variety of databases to determine which words, phrases, and symbols, if any, would be useful to a user operating within the determined context. The resulting group of words, phrases, symbols, etc. is referred to as the domain related to that context. These databases may include information such as user preferences, user history, and application data. The system may then reconfigure the input interface to provide the user with particular keys that are displayed as part of the user interface. These keys can then be selected, such as with a user's finger or a selection device like a mouse or stylus, to provide a user with a shortcut for words, phrases, strings or symbols related to the current context. These shortcut keys can increase the rate at which the user is able to enter information. As the context changes, the input interface will adapt to the user's needs and the input interface may be automatically reconfigured to provide the user with different shortcut keys related to the new context. Thus, the user is provided with a dynamic input interface on a display device that is capable of automatic reconfiguration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "key" is to be broadly interpreted as an input mechanism provided to a user which corresponds to a particular input action such as entry of a letter, word, phrase, or symbol.

Referring now to the figures, FIG. 1 is a diagram showing an illustrative physical computing system (100) which may be used to provide an automatically reconfiguring input interface as described above. According to certain illustrative embodiments, the physical computing system (100) may include a memory (102) having software (104) and data (106) stored thereon.

There are many types of memory available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) in the memory (102). The physical computing system (100) may be embodied as a variety of physical computing devices including, but not limited to, a laptop or tablet computer, and a desktop computer. Particularly, the physical computing system may be a mobile device such as a smart phone, digital music player, or a Personal Digital Assistant (PDA).

Various types of software (106) may be utilized by the physical computing system (100). For example, one type of software which may be stored in memory is Natural Language Processing (NLP) software. NLP software can analyze words provided by a user and ascribe context to words in a manner similar to that of a human. As will be described in more detail below, NLP software can classify words into domains and sub-domains based on the context in which those words are typically used.

A user interface (110) may provide a means for the user (112) to interact with the computing system (100). The user interface may include any collection of devices for interfacing with a human user (112). Such devices may include, but are not limited to, a display device (114) and an input device, such as a keyboard or a mouse. In some examples, the user interface (110) may include a touch-screen device (114) that acts both as a display device and as an input device. In such examples, a stylus may be used to make selections on the touch-screen. Additionally or alternatively, a mouse, trackpad, joystick or the like may be used to make selections among the options displayed on the display device (114) of the user interface (110).

As mentioned above, some touch-screen interfaces are used on smaller devices such as a mobile phone. These devices are often capable of running applications that were originally designed for larger computing device interfaces such as a laptop or desktop computer. For example, many web applications are designed for interaction from a larger computing device. When accessing such applications with a smaller device, the input mechanisms can be slow and cumbersome. In light of this issue, the present specification discloses methods and systems which provide a user with an input interface capable of automatic reconfiguration based on context.

Figure 2:
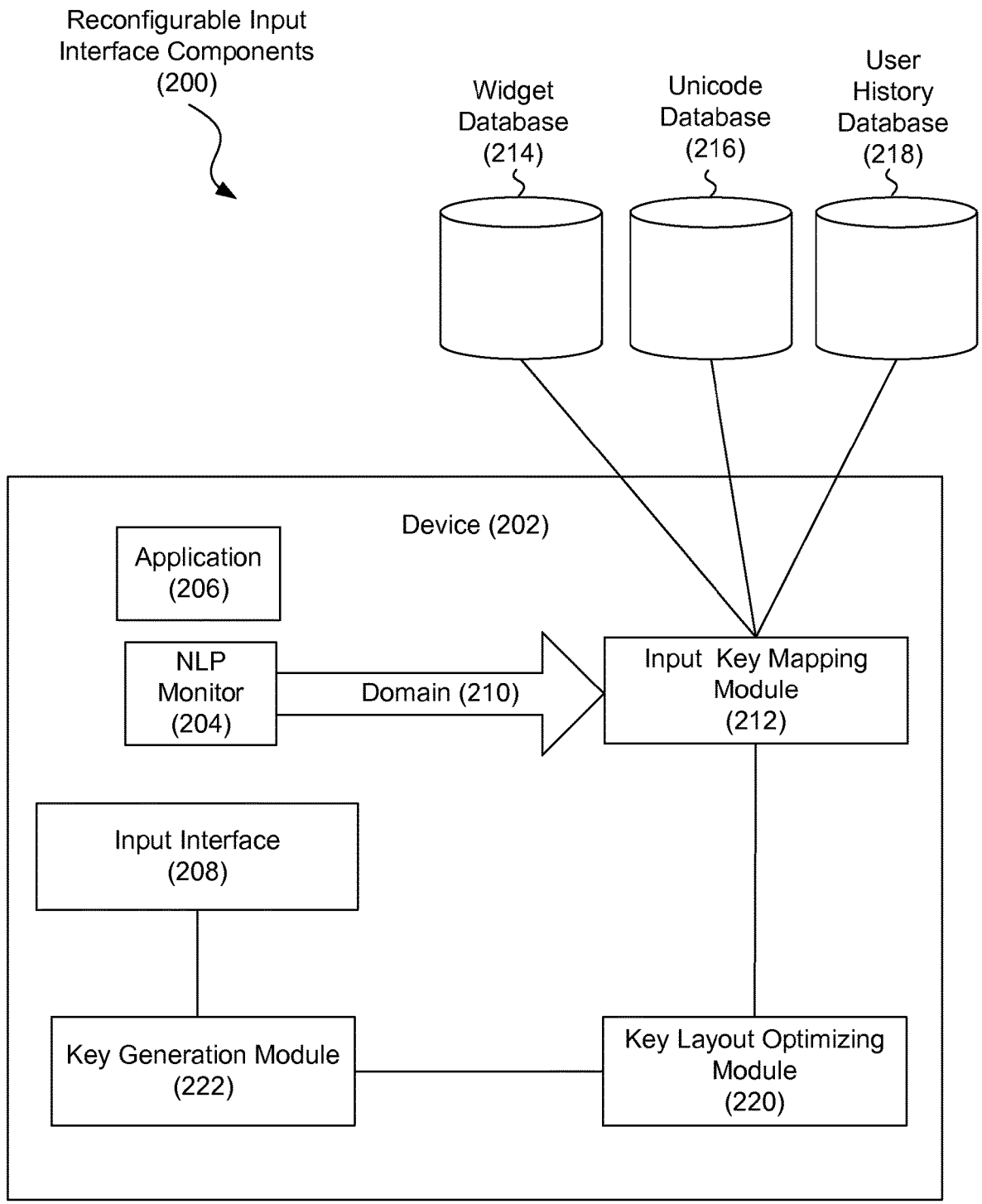
FIG. 2 and FIG. 2A are diagrams showing illustrative reconfigurable input interface components, according to one embodiment of according to principles described herein.

Referring to FIG. 2, computing devices (e.g. 202) typically include a variety of applications (206) which require input from a user. These applications (206) may include web browsers, word processors, and email applications. Entry of information into such applications (206) typically involves natural language. Natural language refers to language that is in a form recognizable to a human rather than to a machine only. A Natural Language Processing (NLP) monitor (204) is able to recognize words that are input into the device. The NLP monitor (204) can classify words into different domains (210). A domain (210) is essentially a grouping of words associated with a particular topic. More detail on domains will be discussed below in the text accompanying FIG. 3.

Figure 2A:
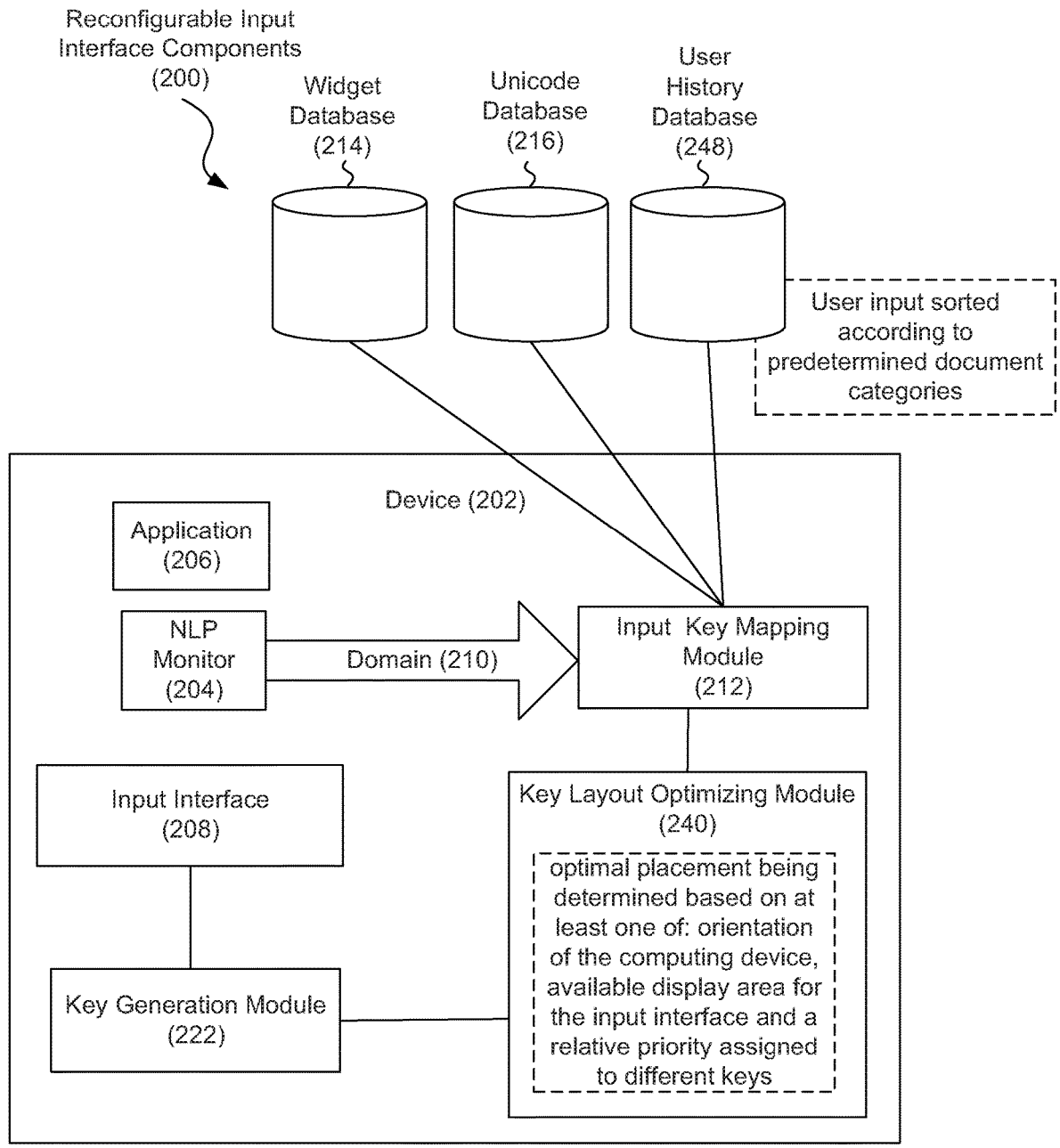

Referring again to FIG. 2, FIG. 2 and FIG. 2A are diagrams showing an illustrative computing device with reconfigurable input interface components (200). According to certain illustrative examples, a device (202) includes hardware capable of running a variety of different pieces of software. This software may include a number of applications (206) as well as a Natural Language Processing (NLP) monitor (204). The NLP monitor (204) can separate words into different domains (210). Based on these domains (210), an input key mapping module (212) can determine which keys, e.g., shortcut keys, should be presented to a user. The input key mapping module (212) can also retrieve information from a variety of different databases (214, 216, 218, 248). In the user history database (248), user input can be sorted according to predetermined document categories. A key layout optimizing module (220, 240) can then optimize the placement of keys to be presented to the user. A key generation module (222) can generate those keys for display on an input interface (208).

The input key mapping module (212) is a component which determines which keys should be presented to a user based on the current context in which the user is involved. Once a context has been determined by the NLP monitor (204), the input key mapping module (212) can be configured to retrieve data from a variety of databases (214, 216, 218) in order to determine which keys should be presented to a user.

The databases (214, 216, 218) available to the input key mapping module (212) may be stored on local storage media or remote storage media. For example, the databases (214, 216, 218) may be stored on a local non-volatile storage medium of the device (202). Additionally or alternatively, the databases (214, 216, 218) may be stored on a remote non-volatile storage medium which is accessible to the device via a number of communication methods.

The different types of databases (214, 216, 218) which may be available to the input key mapping module (212) may include a widget database (214), a user history database (216), and a Unicode database (218). The widget database (214) may be used to retrieve a variety of widgets which may be useful to a user based on the present context. A widget is an element of a user interface which includes data to be manipulated by a user. Widgets can be used as input tools. For example, a time entry widget may allow a user to quickly enter in a time in a valid format.

The input key mapping module (212) may also retrieve information from a Unicode database (216). Unicode is an industry standard for representing text. Different geographical locales may have different methods of presenting input interfaces to a user. The Unicode database can be consulted so that the device (202) provides the input interface in a manner consistent with the appropriate geographic locale.

A user history database (218) can be used to retrieve information about a user's data entry history. This can allow the input key mapping module (212) to determine which words or phrases are commonly used by a particular user in a particular context. For example, a user may commonly use particular phrases when talking about sports. If the particular context, as determine by the NLP monitor (204), relates to sports, then the input key mapping module (212) can determine from the user history database (216) that a particular phrase is often used in this context. A key for this phrase may then be included in the set of keys which will be presented to the user.

After the input key mapping module (212) has determined which keys should be presented to a user, the key layout optimizing module (220) can determine the manner in which the selected keys will be presented to a user. The key layout optimizing module (220) can take into account various information about the device such as the screen size and touch-sensitive hardware capabilities. The key layout optimizing module (220) can also take into account the state of the device (202). For example, many mobile devices will change the arrangement of the input display based on the direction in which the device (202) is being held. For example, if a device is being held sideways, the input display may go into a landscape mode rather than a portrait mode. In this mode, more space may be available for keys.

In some cases, the input key mapping module (212) can assign priority to the keys and widgets which should be presented to the user. The key layout optimizing module (220) can then take the greatest number of higher priority keys which will fit into the allotted space. As the context changes, the priority of different keys and widgets may change. Thus, the key layout optimizing module may remove some keys and add different keys as the context used by the user changes.

The key generation module (222) includes the hardware and software required to generate the keys for display on the input interface (208) as determined by the key layout optimizing module (220). As the keys and widgets presented to a user change, the key generation module (222) will refresh the input interface.

Figure 3:
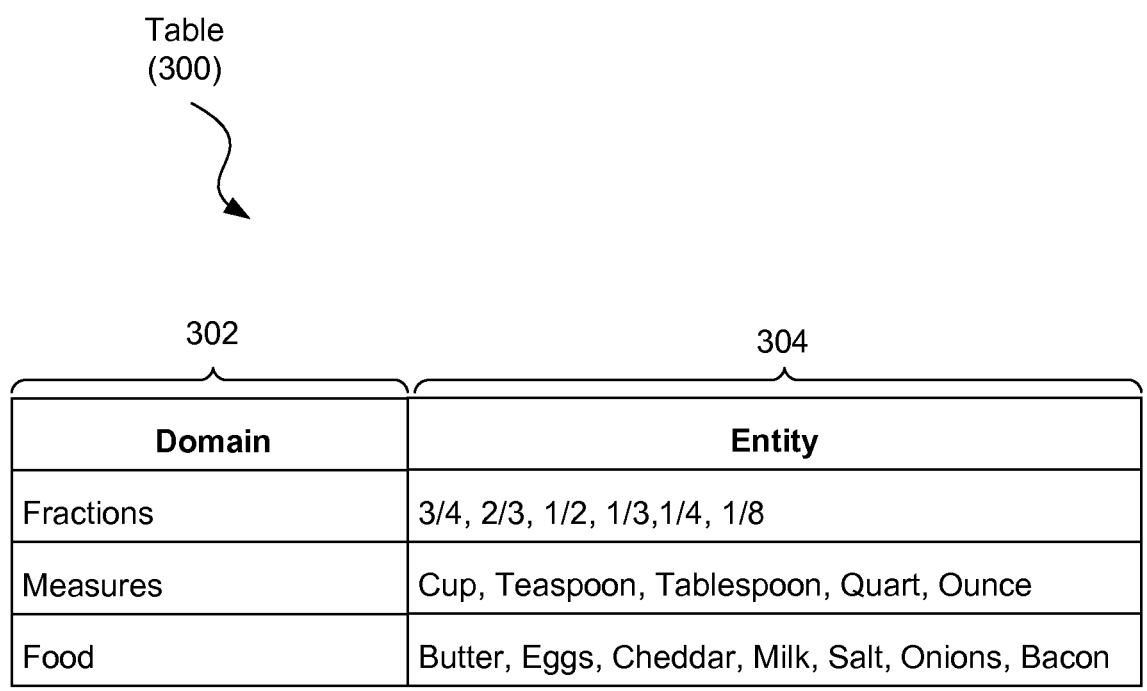
FIG. 3 is a table showing illustrative domains and entities to be used by a reconfigurable input interface, according to one embodiment of principles described herein.

FIG. 3 is a table showing illustrative examples of domains and entities to be used by a reconfigurable input interface. As mentioned above, an NLP monitor (e.g. 204, FIG. 2) can classify words entered by a user into different domains (302). Each domain may include a number of entities (304). Throughout this specification and in the appended claims, the term "domain" is to be broadly interpreted as a grouping of words that relate to a particular topic or classification. The term "entity" refers to specific words, symbols, and phrases within a particular domain.

For example, if a user is typing in a food recipe, the NLP monitor will recognize that a recipe is being typed based on the words input by the user. The NLP monitor with then determine several domains (302) including, a food domain, a fraction domain, and a measurement domain that apply in the context of a food recipe.

The food domain may include common foods and ingredients used in recipes. The entities (304) within the food domain can include, for example, butter, eggs, cheddar, milk, salt, onions, and bacon. Additionally, the measures domain may include entities (304) for a number of commonly used measurements used in recipes such as cup, teaspoon, tablespoon, quart, and ounce. Furthermore, the fractions domain may include entities of common fractions.

Figure 4:
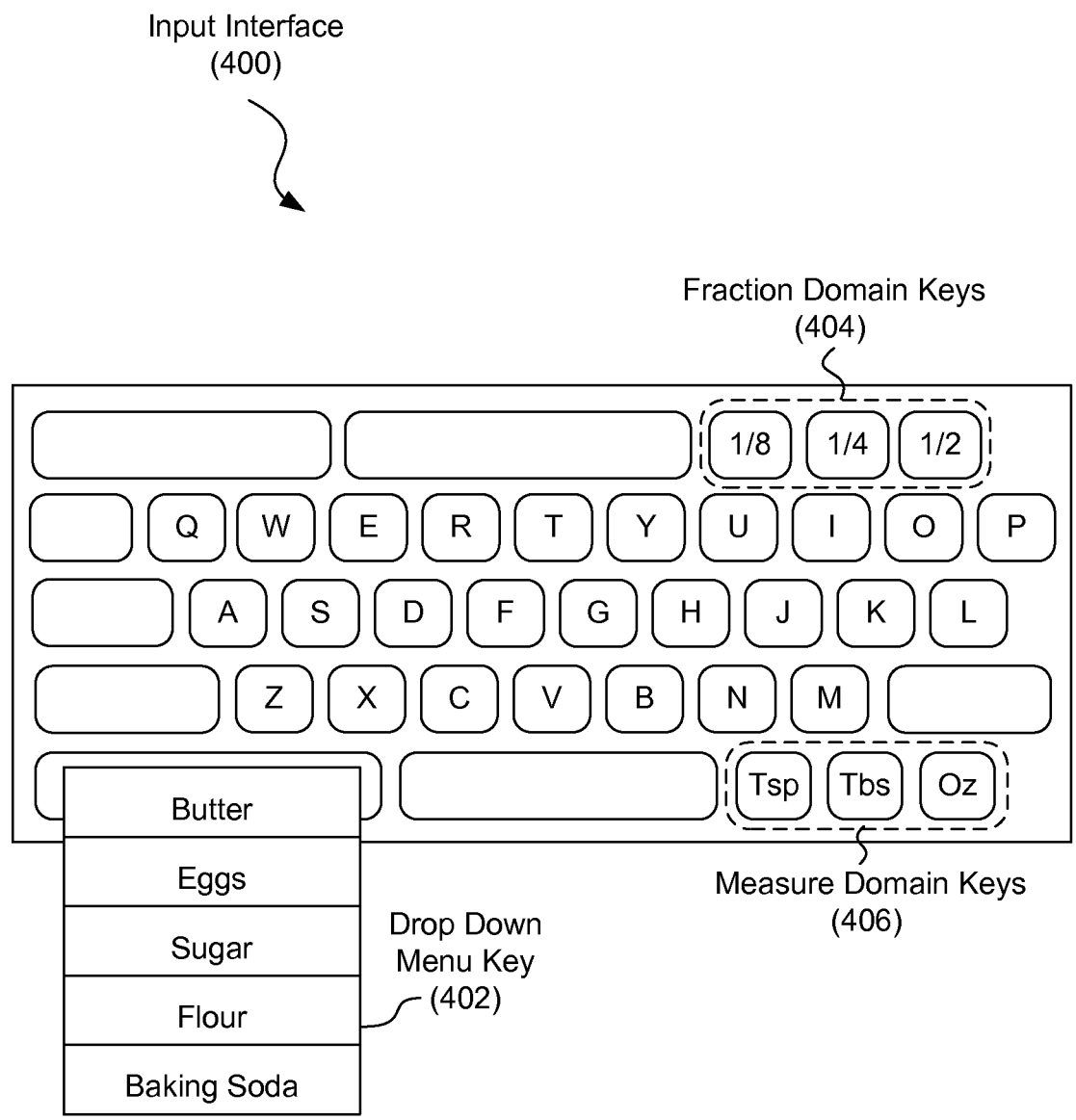
FIG. 4 is a diagram showing an illustrative input interface, according to one embodiment of principles described herein.

FIG. 4 is a diagram showing an illustrative input interface (400). According to certain illustrative examples, the input interface includes the standard QWERTY keyboard layout, allowing a user to type in words in the traditional manner. In addition, the input interface may include fraction a drop down menu key (402) for the food domain, a number of domain keys (404), and a number of measure domain keys (406).

In one example of operation, the user is typing an email to a friend which includes a recipe. Based on some words entered by the user, the NLP monitor (e.g. 204, FIG. 2) determines the context in which the user is operating. Specifically, the NLP monitor determines that the user is entering in a recipe. The input key mapping module (e.g. 212, FIG. 2) then retrieves information as mentioned above to determine which keys should be provided to the user. These keys are then displayed to the user on the input interface (400).

In this case, a drop down menu key (402) is provided for the food domain entities. For example, when a user presses the drop down menu key, a list of words or phrases related to a particular domain appears. The user may then select a word or phrase from the list. In this case, the user can choose one of the foods provided in the list. The foods provided to the user may be based on the most commonly used foods in recipes. In addition, the foods provided in the list may be based on user history. In some cases, the NLP monitor can determine a more specific food domain such as breakfast food, and common ingredients in breakfast food can be provided.

In this example, a set of keys (404) may be provided for the fraction domain and a set of keys (406) may be provided for the measures domain. These keys provide a user with quick access to regularly used symbols in recipes. Through use of the drop down menu keys and the provided domain keys (404, 406), the user is able to much more easily and accurately complete entry of the desired recipe information into the computing device through the reconfigured input interface (400).

Figure 5:
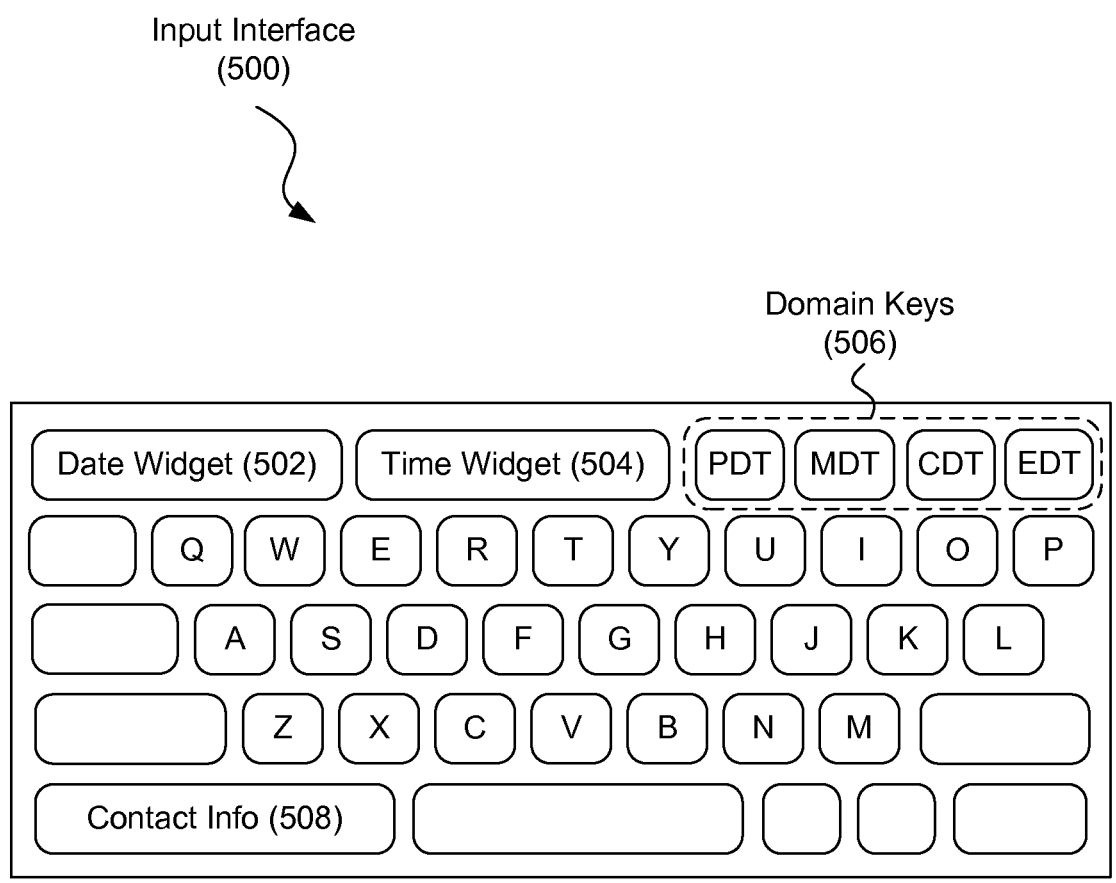
FIG. 5 is a diagram showing an illustrative input interface, according to one embodiment of principles described herein.

FIG. 5 is a diagram showing an illustrative input interface (500) according to another example. As shown in FIG. 5, one type of key that may be presented to a user is a widget. As mentioned above, a widget is an element of an input interface that can provide a user with specific input options in a specific manner. The widgets provided to a user depend on the context in which the user is currently entering information. For example, if a user is typing an email to a business contact with a request to set up a meeting, then the NLP monitor can determine from the words used by the user that the context relates to a meeting. The input key mapping module can then automatically provided the user with appropriate widgets. In this example, the user may be provided with a date widget (502), a time widget (504), and a contact info widget (508).

The date widget (502) can provide a user with a quick and efficient means for a user to enter in a date in the appropriate format. Specifically, the date widget (502) can save the user time by providing the month, day of the month, and day of the week, quickly. One example of a date widget is to bring up a calendar screen on which the user can select the appropriate date. This date can then be entered in based on a predetermined format. The format that the date widget uses to enter in the date may depend on the user's history of date entries. For example, if the user prefers to type out the entire month rather than use an abbreviation, the date widget can enter in the month accordingly. Alternatively, the user may select a default date entry format this is used thereafter.

The time widget (504) can provide a user with a quick and efficient means for entering a time in the appropriate format. The time widget (504) can save the user from having to find the colon key, which can be time consuming to locate on many mobile devices where input is limited. Additionally, the user may not have to type out "a.m." or "p.m." Rather, the time widget can perform this task for the user. In addition to the time widget (504), a number of domain keys (506) may be provided to the user. For example, the user may be presented with a number of keys for the different time zones within the U.S. These keys may be provided if the user's input history suggests that he or she commonly schedules meetings with people of different time zones.

The user may also be provided with a key that attaches the user's contact information to the message being written. This may be a predetermined line or lines of text that give contact information such as email, phone, and fax. Through use of the widgets and keys which are automatically provided to a user based on an automatically determined context, the user is provided with a faster means for entering data into a computing device. This is especially helpful for smaller and more compact devices such as PDAs and smart phones.

Figure 6:
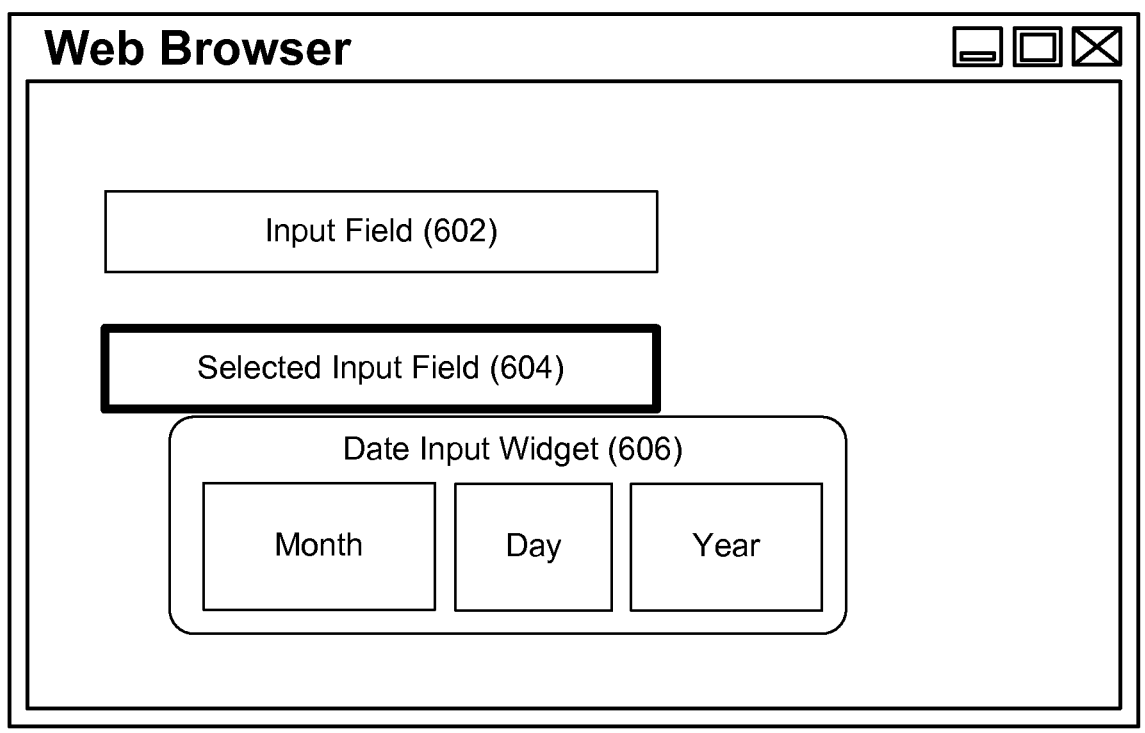
FIG. 6 is a diagram showing an illustrative application and interface, according to one embodiment of principles described herein.

FIG. 6 is a diagram showing an illustrative application and interface. According to certain illustrative examples, a web browser (600) may be used to access a web application that includes a number of input fields (602). The user may then select one of those input fields for entry. Based on the selected input field (604), the user may be provided with an interface. The interface may include a widget.

For example, if the user input history for that particular field indicates that dates are often entered into that field, then the user can be provided with a date input widget (606). Additionally, if the context of the application surrounding the selected input field indicates that the input field (606) is used for a date entry, then the date input widget (606) may be supplied.

Figure 7:
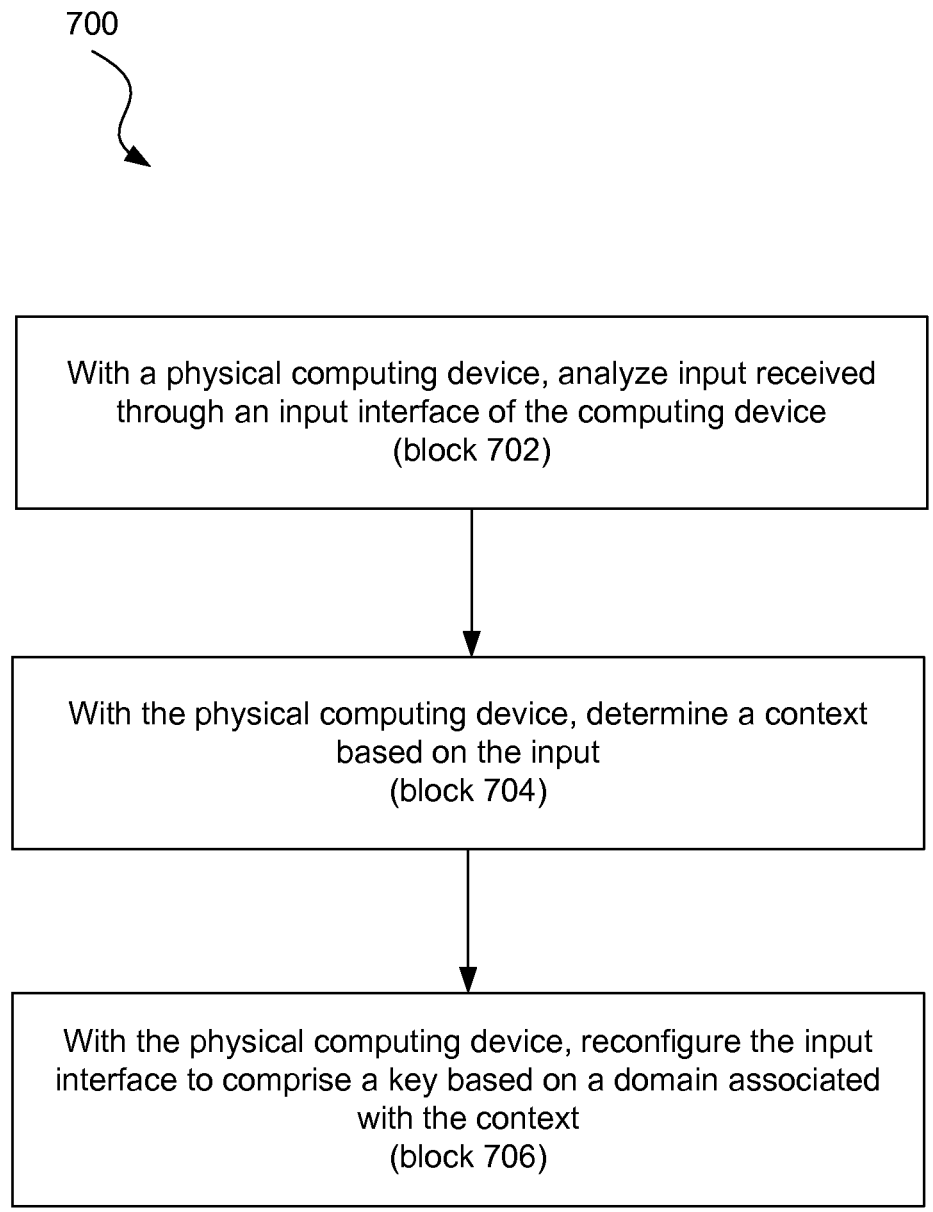
FIG. 7 is a flowchart showing an illustrative method for providing an automatically reconfigurable input interface, according to one embodiment of principles described herein.

FIG. 7 is a flowchart showing an illustrative method (700) for providing an automatically reconfigurable input interface. According to certain illustrative examples, the method includes, with a physical computing device, analyzing (block 702) input received through an input interface of the computing device, with the physical computing device, determining (block 704) a context based on the input, and with the physical computing device, reconfiguring (block 706) the input interface to comprise a key based on a domain associated with the context.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for automatically reconfiguring an input interface, the method comprising:
    with a physical computing device comprising a touch sensitive display on which a user input interface comprising a plurality of user-selectable keys is displayed, receiving user input comprising multiple words through said user input interface of said computing device;
    with said physical computing device, prior to offering multiple sets of new short-cut keys, using natural language processing (NLP) on said multiple words of said user input to identify one particular topic based on a context of said user input, said one particular topic having a plurality of different corresponding domains, each domain comprising a plurality of words, phrases or symbols specifically used in discussing that particular topic;
    with said physical computing device, after identifying said one particular topic, reconfiguring said input interface to comprise multiple sets of short-cut keys added to said plurality of user-selectable keys, wherein each set of short-cut keys comprises a plurality of keys for entering the plurality of words, phrases or symbols of a corresponding domain of said plurality of different domains;
    wherein the plurality of keys from each of said multiple sets of short-cut keys are displayed together as a group belonging to the corresponding domain of said plurality of different domains, and
    determining and utilizing an optimal placement of said plurality of user-selectable keys and each of said multiple sets of short-cut keys within said input interface of said computing device, said optimal placement being determined based on at least one of: orientation of said computing device, available display area for said input interface and a relative priority assigned to different keys;
    wherein said multiple sets of short-cut keys remain in said input interface of said computing device until the context of said user input changes based on further input.

2. The method of claim 1, wherein said further input comprises multiple words indicative of a context and particular topic different from a current context.

3. The method of claim 1, wherein said particular topic is sports and said domains are groups of words associated with the particular topic of sports.

4. The method of claim 1, further comprising, retaining all keys of the set of user-selectable keys when adding to the input interface the multiple sets of short-cut keys, wherein said optimal placement is determined based on available display area for the input interface.

5. The method of claim 1, wherein one of said short-cut keys invokes a widget.

6. The method of claim 1, wherein one of the multiple sets of short-cut keys comprises a drop down menu.

7. The method of claim 1, further comprising, in response to said change in said context based on further input,
    reconfiguring said input interface by changing the short-cut keys.

8. The method of claim 1, wherein said determining and utilizing an optimal placement is based on an orientation in which a user is holding said physical computing device.

9. The method of claim 1, further comprising:
    selecting a function of one of said short-cut keys based on an input string from said corresponding domain that is commonly used by a particular user when entering input in said context as indicated by a user input history of that particular computing device.

10. The method of claim 1, wherein one of said short-cut keys is a contact information key that adds a user's contact information to a message being entered on said physical computing device.

11. The method of claim 1, in which said context is a food recipe and said short-cut keys cause input of a recipe measurement or recipe ingredient.

12. The method of claim 1, wherein said set of user-selectable keys comprises a qwerty keyboard to which said short-cut keys are added.

13. The method of claim 1, wherein, when the determined context is sports, the method further comprising adding short-cut keys to the input interface that include keys each representing a word or phrase that the user inputting the user input has previously used in discussions about sports based on a user history database for that user.

14. The method of claim 1, further comprising assembling at least one of said domains from a number of databases based on said context.

15. The method of claim 14, wherein said number of databases comprises a database that includes input previously entered by a user of said physical computing device.

* * * * *